(No Model.)
W. W. HARTER.
SHOCK COMPRESSOR.
No. 411,721. Patented Sept. 24, 1889.
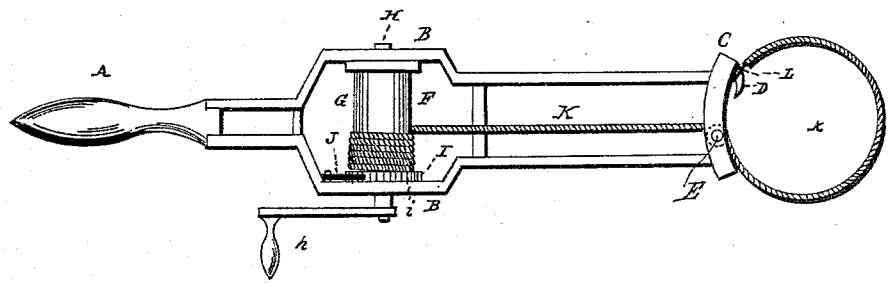
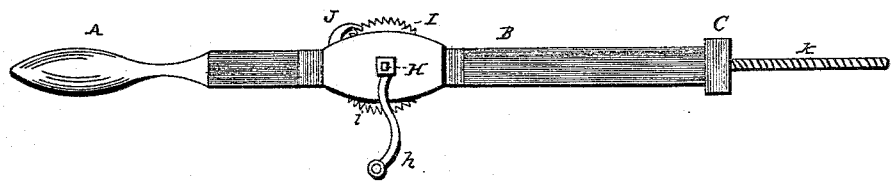
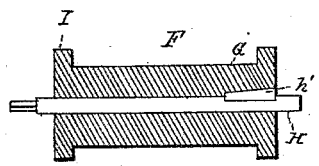
WITNESSES
Mo. B. Harris
C. R. Ferguson
INVENTOR
Wm. W. Harter,
by E. W. Anderson,
Attorney

UNITED STATES PATENT OFFICE.

WILLIAM W. HARTER, OF ARCANUM, OHIO.

SHOCK-COMPRESSOR.

SPECIFICATION forming part of Letters Patent No. 411,721, dated September 24, 1889.

Application filed December 20, 1887. Serial No. 258,487. (No model.)

*To all whom it may concern:*

Be it known that I, WILLIAM H. HARTER, a citizen of the United States, and a resident of Arcanum, in the county of Darke and State of Ohio, have invented certain new and useful Improvements in Shock-Compressors; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a plan view of my invention. Fig. 2 is a side view thereof. Figs. 3 and 4 are detail views.

The invention is a device for compressing corn or fodder in shocks sufficiently to permit the same to be tied securely and tightly; and it consists in the construction and novel combination of parts hereinafter described, illustrated in the drawings, and pointed out in the appended claim.

Referring to the drawings by letter, A designates the handle of the device, having secured to its opposite sides the two forwardly-extending plates B, preferably of metal, which plates have secured to their forward ends the transverse inwardly-curved plate C, provided with the central slot $c$, for a purpose hereinafter described, and having the hook D secured to it a suitable distance on one side of said opening.

E is a small anti-friction roller journaled in bearings in the slot $c$ in the plate C on the side of the slot $c$ opposite the hook.

F is a reel composed of the spool or flanged drum $g$ and the crank-shaft H, journaled in the plates B near the handle. The said crank-shaft passes through the bore or central opening in the spool or drum, and has the crank-handle $h$ on one end, the other end being secured to the drum by the key or spline $h'$. The flange I of the spool adjacent to the crank-handle is formed into a ratchet by the circumferential teeth $i$.

J is a latch or detent pivoted to the side plate of the device adjacent to the ratcheted flange and engaging the ratchet I, so that the rope when wound up can be held by shoving the point of said latch or detent between the teeth of the ratchet.

K is the rope, having its inner end secured to the spool or drum, extending thence through the slot $c$, and with a ring or hook L secured to its outer end for attachment to the hook D. The rope can thus be formed into a loop $k$ outside the frame and between the slot $c$ and the hook D.

The device in practice is about three feet long, but can be somewhat longer or shorter, according to circumstances.

In practice the plates B and C constitute a frame made in one piece of malleable iron.

The method of operating the device is as follows: The operator, after putting the free end of the rope around the shock of corn or fodder to be compressed and pressing the plate C against the same with one hand, with the other hand hooks the free end in the hook D and winds the rope on the reel until the shock or bundle is sufficiently compressed. He then pushes with his thumb the detent into engagement with the ratchet I, and thus holds the corn or fodder at that degree of compression. The device being now locked, he can securely tie the corn or fodder.

The device is simple, cheap, and effective, and saves much labor and annoyance while doing the work.

Having described my invention, I claim—

An implement to compress corn or fodder for tying, consisting of the handle A, having secured to it the forwardly-extending plate B, the curved transverse plate C', secured to the forward ends of said plates and provided with the central slot $c$ and hook D, the anti-friction roller E, journaled in bearings in the slot $c$ opposite to the hook, the reel F, journaled in the plates B and having one of its flanges formed into a ratchet to engage the detent or latch J, the rope K, having its inner end secured to the reel F, passing through the slot $c$, and having secured to its outer end a ring L, for attachment to the hook D, substantially as specified.

In testimony whereof I affix my signature in presence of two witnesses.

WILLIAM W. HARTER.

Witnesses:
 ALFRED VANMETER,
 GEORGE LUDY.